United States Patent
Nakadai et al.

(10) Patent No.: US 8,155,331 B2
(45) Date of Patent: Apr. 10, 2012

(54) SOUND SOURCE TRACKING SYSTEM, METHOD AND ROBOT

(75) Inventors: Kazuhiro Nakadai, Wako (JP); Hiroshi Tsujino, Wako (JP); Yuji Hasegawa, Wako (JP); Hiroshi Okuno, Kyoto (JP)

(73) Assignee: Honda Motor Co., Ltd., Tokyo (JP)

( * ) Notice: Subject to any disclaimer, the term of this patent is extended or adjusted under 35 U.S.C. 154(b) by 828 days.

(21) Appl. No.: 12/293,358

(22) PCT Filed: May 9, 2007

(86) PCT No.: PCT/JP2007/059599
§ 371 (c)(1),
(2), (4) Date: Sep. 17, 2008

(87) PCT Pub. No.: WO2007/129731
PCT Pub. Date: Nov. 15, 2007

(65) Prior Publication Data
US 2010/0034397 A1   Feb. 11, 2010

Related U.S. Application Data

(60) Provisional application No. 60/799,106, filed on May 10, 2006.

(51) Int. Cl.
*H04R 29/00* (2006.01)
(52) U.S. Cl. ............................. 381/58; 381/92; 700/258
(58) Field of Classification Search .................. 381/58, 381/91, 92, 66; 700/258, 259, 245, 275
See application file for complete search history.

(56) References Cited

U.S. PATENT DOCUMENTS

| | | | |
|---|---|---|---|
| 2002/0181723 A1* | 12/2002 | Kataoka | 381/92 |
| 2006/0245601 A1* | 11/2006 | Michaud et al. | 381/92 |
| 2009/0030552 A1* | 1/2009 | Nakadai et al. | 700/258 |

FOREIGN PATENT DOCUMENTS

| | | |
|---|---|---|
| JP | 2002-366191 | 12/2002 |
| JP | 2003-251583 | 9/2003 |
| JP | 2004-198656 | 7/2004 |
| JP | 2006-121709 | 5/2006 |

OTHER PUBLICATIONS

A Framework for Multi-Domain Conversational Systems, Makoto Nagamori et al., (English abstract included), Jun. 2, 2000.
Design and Evaluation of a Unified Management Architecture for Multi-Domain Spoken Dialogue, Nobuo Kawaguchi et al., (English abstract included), Jun. 1, 2001.
Cross Domain Dialogue Modelling: An Object-Based Approach, Ian O'Neill et al., (English text), Oct. 2, 2004.
Sound Source Tracking with Orientation Estimation by Using a large Scale Microphone Array, Kazuhiro Nakadai et al., (English abstract included), Dec. 6, 2005.

* cited by examiner

*Primary Examiner* — Thomas L Dickey
*Assistant Examiner* — Fazli Erdem
(74) *Attorney, Agent, or Firm* — Rankin, Hill & Clark LLP

(57) ABSTRACT

A result of a sound source direction measurement based on an output of an REMA (first microphone array) (11) and a result of a sound source position measurement based on an output of an IRMA (second microphone array) (12) are integrated through a particle filter or in space. Thus, the different microphones, i.e., the REMA (11) and the IRMA (12) can cancel mutual defects or ambiguities with each other. Therefore, from views of improvement in accuracy and robustness a performance of sound source localization can be improved.

20 Claims, 10 Drawing Sheets

FIG.1
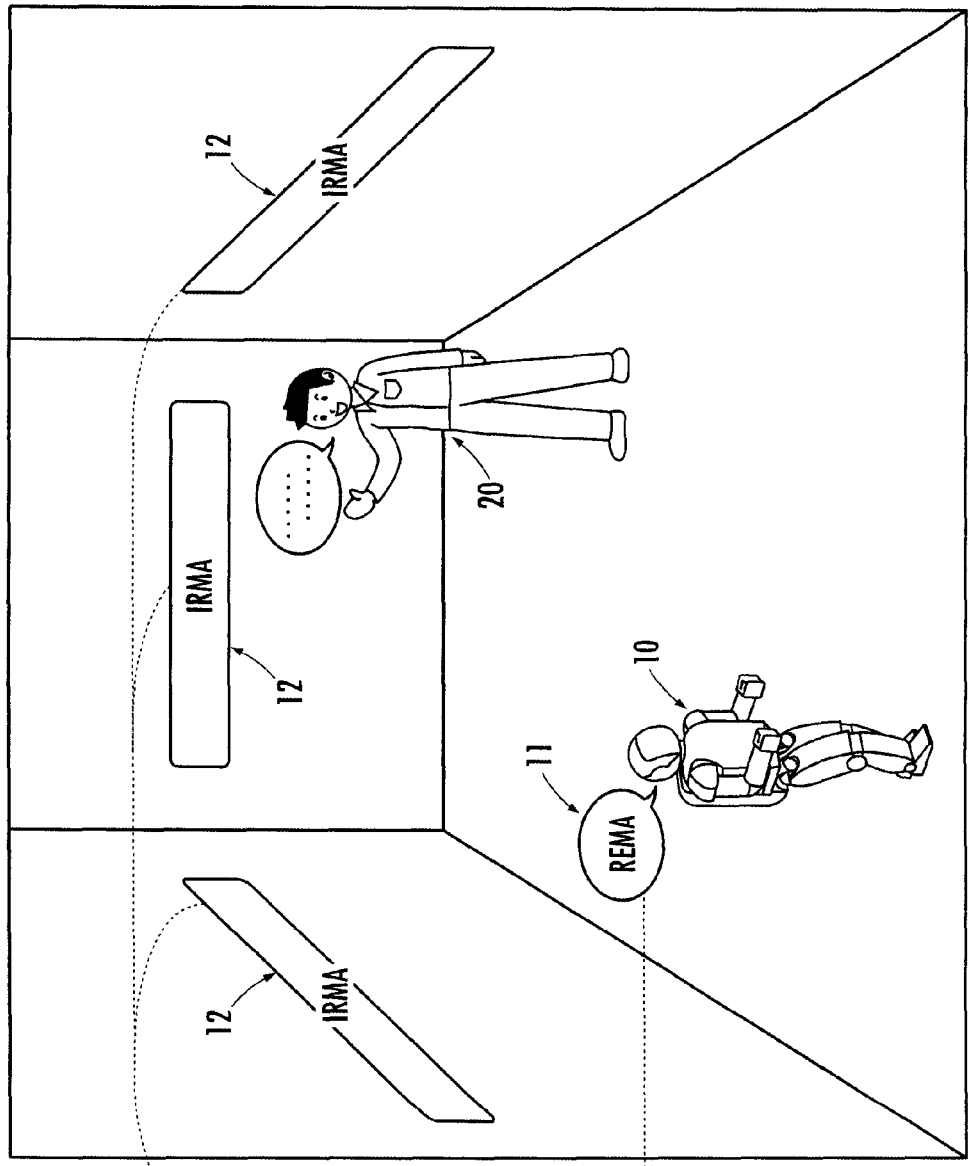
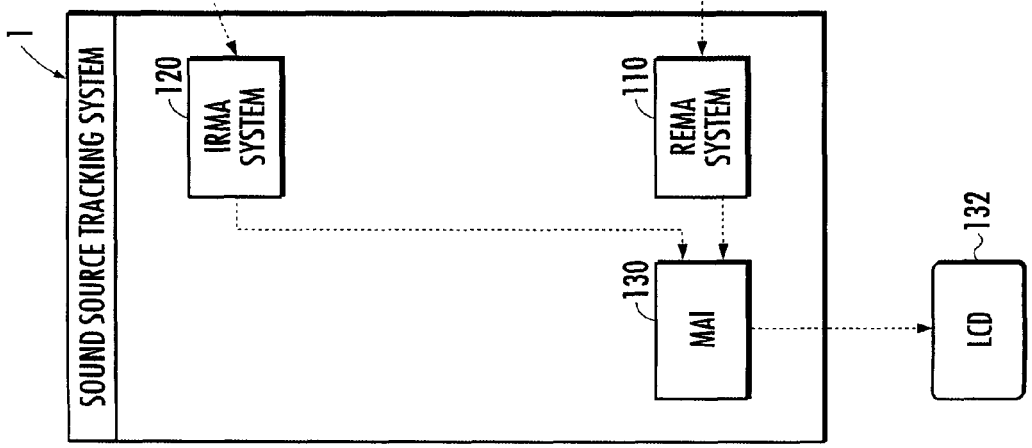

SOUND SOURCE TRACKING SYSTEM, METHOD AND ROBOT

TECHNICAL FIELD

The present invention relates to a sound source tracking system for measuring in real time the position of a sound source.

BACKGROUND ART

From the standpoint of improving robustness in perception, it is essential to integrate and synthesize various types of information. For example, a time-wise integration method for audiovisual information (see Document No. 1), the McGruck Effect utilized in sound recognition (see Document No. 2), and an audiovisual integration method utilized in sound source localization (see Document No. 3), are known. Furthermore, a method for carrying out sound source localization by a microphone built into a robot has been proposed (see Document No. 4), and further, a method for carrying out sound source localization by means of a microphone array affixed to a ceiling or the like has also been proposed (see Document No. 5).

Document No. 1: Makoto Nagamori et al., "A Framework for Multi-Domain Conversational Systems," Information Processing Society of Japan Research Report, 2000-SLP-31-7, 2000.

Document No. 2: Nobuo Kawaguchi et al., "Design and Evaluation of a Unified Management Architecture for Multi-Domain Spoken Dialogue," Information Processing Society of Japan Research Report, 2001-SLP-36-10, 2001.

Document No. 3: I. O'Neill et al., "Cross Domain Dialogue Modeling: An Object-Based Approach," In Proc. ICSLP, Vol. 1, 2004.

Document No. 4: Japanese Laid-Open Patent Publication No. 2004-198656

Document No. 5: Japanese Laid-Open Patent Publication No. 2006-121709

However, in the aforementioned prior art techniques, there is still room for improvement, taking into consideration robustness and accuracy with respect to tracking of sound source localization.

The present invention offers a solution by providing a sound source tracking system, which aims to improve performance in tracking of sound source localization from the viewpoint of robustness and accuracy.

DISCLOSURE OF THE INVENTION

A sound source tracking system according to a first feature of the invention is a sound source tracking system for measuring in real time the position of a sound source, comprising:

a first processor for measuring a position or direction of the sound source according to a beam forming method based on an output from a first microphone array, which is built into a moving body having a movement function, and a posture of the first microphone array;

a second processor for measuring the position of the sound source based on an output from a second microphone array, which is fixedly arranged; and a third processor for measuring the position of the sound source by integrating respective measurement results from the first and second processors utilizing a particle filter.

By means of the sound source tracking system according to the first feature of the invention, the sound source position or direction measurement result based on the output from the first microphone array, and the sound source position measurement result based on the output from the second microphone array are integrated or spatially integrated utilizing the particle filter. Owing thereto, mutual defects and ambiguities of the different microphone arrays can be resolved. Accordingly, considering improvements in accuracy and robustness, the performance of sound source localization can be enhanced.

In a sound source tracking system according to a second feature of the invention, the second processor in the sound source tracking system of the first invention estimates a distance between respective plural microphones making up the second microphone array and the body, and measures the position of the sound source based solely on outputs from microphones among the plural microphones for which the calculated distance is a given threshold amount or lower.

By means of the sound source tracking system according to the second feature of the invention, a sub-array method is adopted in which a selection is made based on the distance between the sound source and the respective plural microphones that make up the second microphone array, wherein only a partial collection of the aforementioned second microphones are used. Owing thereto, the computational load on the second processor is reduced and the time required for calculation is shortened.

In a sound source tracking system according to a third feature of the invention, the third processor in the sound source tracking system of the first invention measures a speed of the sound source, and based on the measurement result thereof, the position of the sound source is measured while switching a transition model of the particle filter.

By means of the sound source tracking system according to the third feature of the invention, a transition model is used as the situation demands corresponding to the sound source speed, and more particularly corresponding to the behavioral aspects of the sound source, which are inferred taking into consideration the speed of the sound source. Owing thereto, in a space where multiple sound sources are present, a situation in which a difference in the sound source that belongs to localization tracking object may be ambiguous can be avoided. For example, by considering the behavioral aspects of each of the sound sources, which are inferred by taking into consideration the respective speeds of first and second sound sources, a condition in which it becomes ambiguous or obscure as to whether the tracking object is the first sound source or the second sound source is avoided. In addition, by resolving this type of ambiguity, reliability of localization tracking of each of the sound sources can be improved.

In a sound source tracking system according to a fourth feature of the invention, the third processor in the sound source tracking system of the first invention calculates a likelihood of the measurement result by each of the first and second processors, and measures the position of the sound source based on a weighted sum of the aforementioned likelihoods.

By means of the sound source tracking system according to the fourth feature of the invention, localization results from differing sound sources produced by the different microphone arrays, an more specifically, the measurement result of the position or direction of the sound source from the first processor and the measurement result of the position of the sound source from the second processor, are integrated in accordance with the weighted sum of the likelihoods of each of the measurement results. Accordingly, compared to a case of directly integrating the measurement results, the measurement results can be integrated more easily.

A sound source tracking method according to a fifth feature of the invention is a sound source tracking method for measuring in real time the position of a sound source, comprising the steps of:

performing a first process for measuring a position or direction of the sound source according to a beam forming method based on an output from a first microphone array, which is built into a moving body having a movement function, and a posture of the first microphone array;

performing a second process for measuring the position of the sound source based on an output from a second microphone array, which is fixedly arranged; and performing a third process for measuring the position of the sound source by integrating respective measurement results from the first and second processes utilizing a particle filter.

By means of the sound source tracking method according to the fifth feature of the invention, performance in tracking sound source localization can be improved in consideration of robustness and accuracy.

A robot according to a sixth feature of the invention makes up a robot, which is used in a sound source tracking system for measuring in real time the position of a sound source, the sound source tracking system comprising:

a first processor for measuring a position or direction of the sound source according to a beam forming method based on an output from a first microphone array, which is built into a moving body having a movement function, and a posture of the first microphone array;

a second processor for measuring the position of the sound source based on an output from a second microphone array, which is fixedly arranged; and a third processor for measuring the position of the sound source by integrating respective measurement results from the first and second processors utilizing a particle filter, wherein the first microphone array is built into the robot, and the robot further comprises a control system for controlling movement of the robot based on the position of the sound source as measured by the third processor.

By means of the robot according to the sixth feature of the invention, because performance in tracking sound source localization can be improved in consideration of robustness and accuracy, the behavior of the robot can be suitably controlled based on localization of the sound source.

BRIEF DESCRIPTION OF THE DRAWINGS

FIG. 1 is a schematic structural view of a sound source tracking system;

BEST MODE FOR CARRYING OUT THE INVENTION

An explanation shall be made with reference to the drawings concerning an embodiment of the sound source tracking system of the present invention.

The sound source tracking system 1, as shown in FIG. 1, is a system for measuring the position of a sound source (i.e., a speaking person) 20, utilizing a REMA (abbreviation for "Robot-Embedded Microphone Array" and corresponding to a first microphone array) 11 which is embedded in the robot 10, and an IRMA (abbreviation for "In-Room Microphone Array" and corresponding to a second microphone array) 12 which is arranged in a fixed manner within the environment where the robot 10 is present. The sound source tracking system 1 comprises a REMA system (corresponding to a first processor) 110, an IRMA system (corresponding to a second processor) 120, and a MAI (abbreviation for "microphone array integrator" and corresponding to a third processor) 130.

Figure 2:
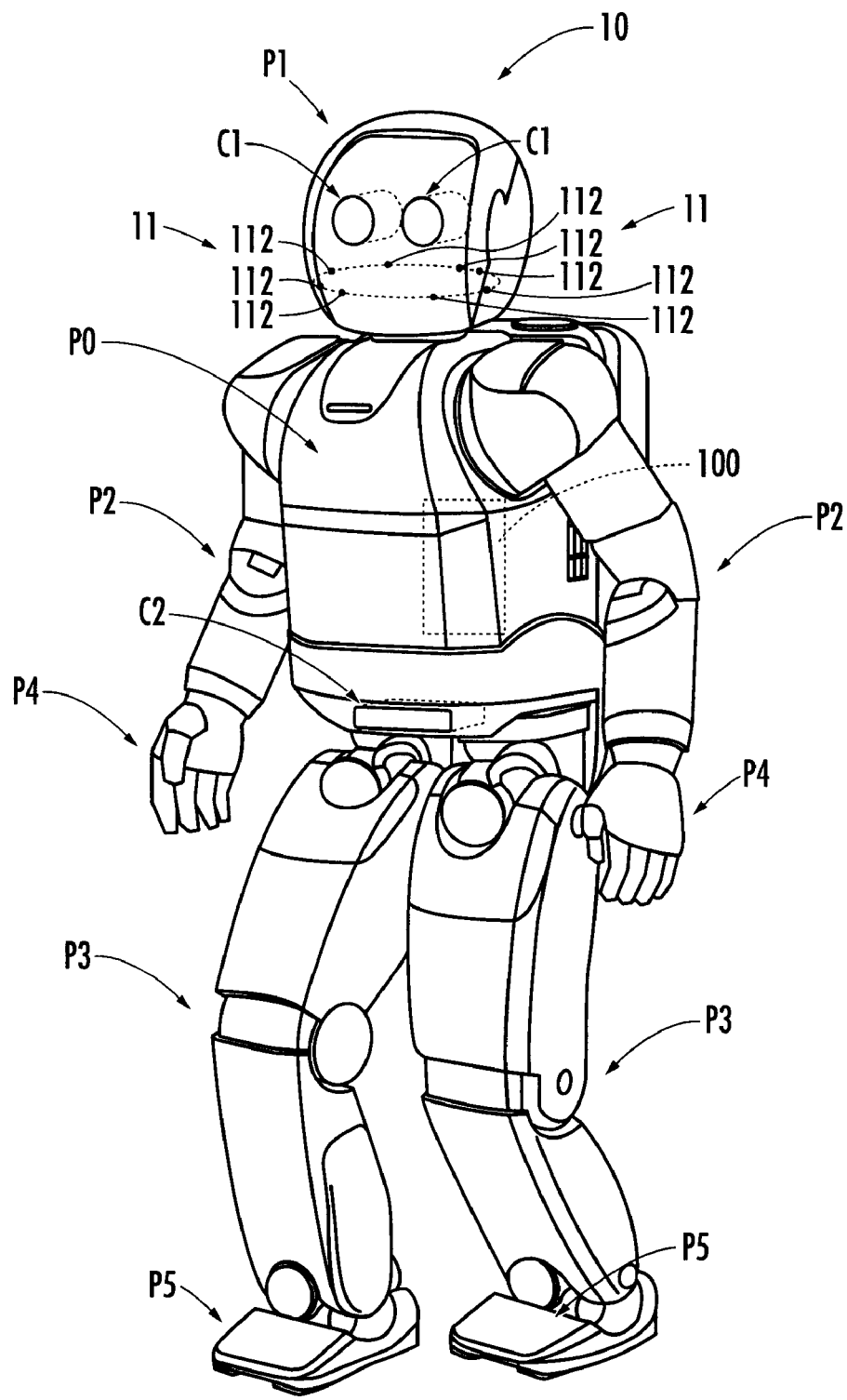
FIG. 2 is a schematic structural view of a robot and a REMA (Robot-Embedded Microphone Array)

As shown in FIG. 2, the robot 10 comprises a base (body portion) P0, a head portion P1 disposed on top of the base P0, left and right arms P2 that extend from both left and right sides on the upper portion of the base P0, hands P4 that are disposed on distal ends of the arms P2, left and right legs P3 that extend downwardly from the bottom of the base P0, and feet P5 that are attached to distal ends of the legs P3. In the robot 10, as disclosed in the published Japanese translation of PCT Application No. WO2003/090978 and the published Japanese translation of PCT Application No. WO2003/090979, the movement of actuators (or motors) is controlled by a control system 100, wherein bending and stretching motions of the arms P2 and legs P3 can be caused in multiple joint portions thereof, corresponding to the plural joints of the human shoulder joints, elbow joints, wrist joints, hip joint, knee joints, and ankle joints, etc. The robot 10 can move autonomously by means of movements accompanying repeated leaving from and landing on the floor of the respective left and right legs P3 (or feet P5).

The REMA 11 is built into the head portion P1. The REMA 11 is made up from eight non-directional microphones 112, which are arranged in an annular form on a surface parallel with a base body horizontal surface. On the robot 10, the head portion P1 can be rotated about a yaw axis with respect to the base body P0, and further, the head portion P1 can be tilted with respect to the base body P0. The REMA 11 may also be mounted at a location different from the head portion P1, for example, in the body portion P0 of the robot 10.

A pair of laterally arrayed head cameras (CCD cameras) C1 are mounted facing in the frontward direction of the robot 10. A waist camera (infrared camera) C2 is mounted in a forward side lower portion of the base body P0. Various sensors, such as a gyro-sensor, which outputs a signal corresponding to the speed of the base body P0, rotary encoders that output signals corresponding to joint angles of the respective joints, and six-axial force sensors that output signals corresponding to the floor-reaction force acting on the legs P3, etc., also are mounted on the robot 10.

Figure 3:
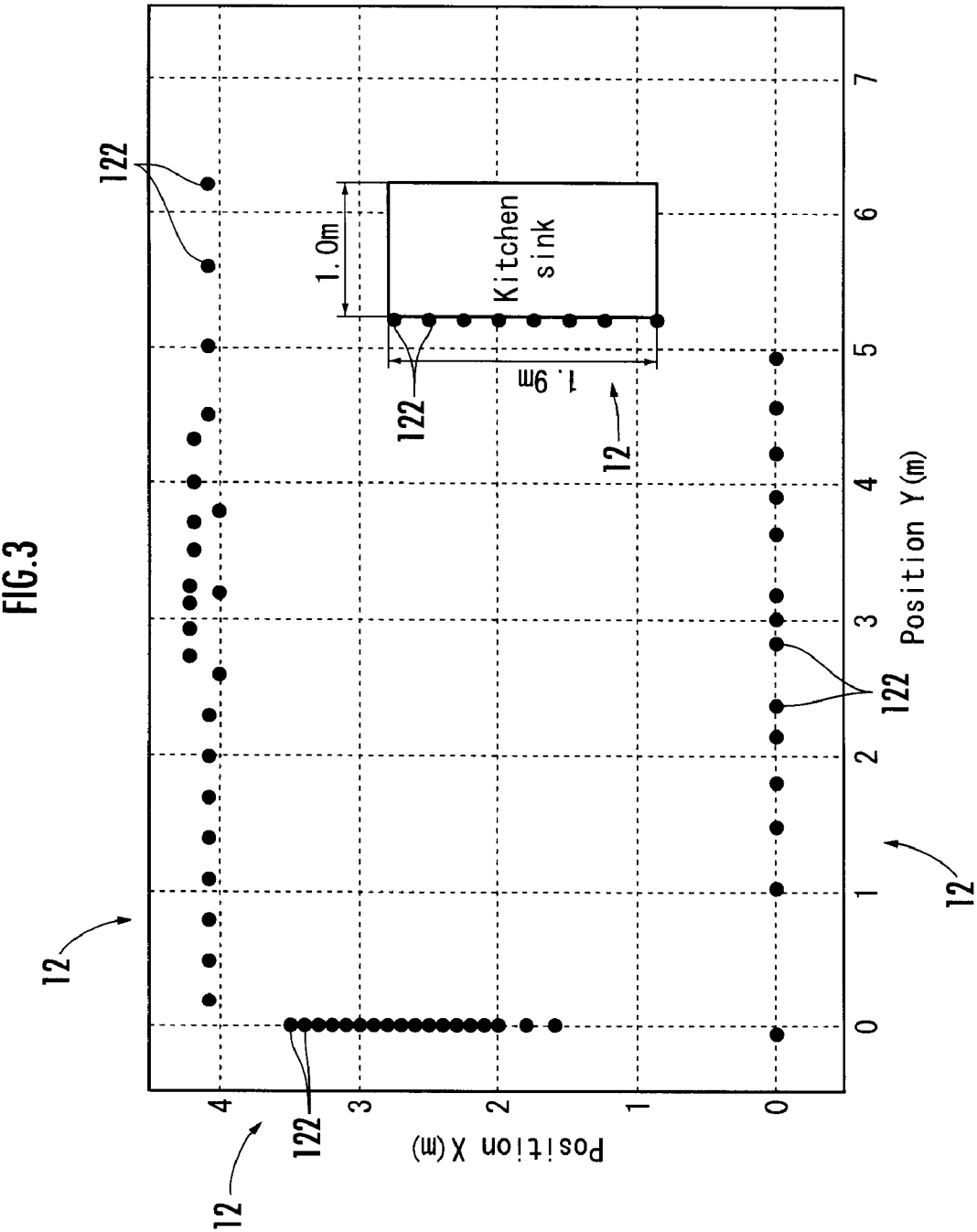
FIG. 3 is a schematic structural view of an IRMA (In-Room Microphone Array)

The IRMA 12 is arranged over the entirety of the room, for example as shown in FIG. 3, and is constituted by plural microphones 122 affixed to the walls or the like. For designing the beam former for use by the IRMA, a 0.25 m mesh is utilized for discretizing the interior of the room. The discretization region (X-Y plane) is defined at a range of X=1.0-5.0 m, Y=0.5-3.5 m, and Z=1.2 m. By means of such discretization, 221 individual evaluation points for sound source localization are obtained. Further, in order to respond to environments in which reverberations are non-uniform, or to arbitrary microphone layouts, an impulse response is measured at all of the sound source localization evaluation points under a condition in which the speaker (sound source) 20 is facing toward the robot 10. Based on a transfer function, which is obtained based on such a measurement result, a beam former "M-BF" is so designed. In addition, another beam former "SM-BF" is designed in which a sub-array method is applied with respect to the beam former M-BF. In place of or in addition to M-BF or SM-BF, Sim-BF or Rsim-BF may be adopted as beam formers for use by the IRMA. "Sim-BF" defines a beam former, which is designed such that the room interior is presumed simply to be a free space. "Rsim-BF" defines a beam former, which is designed based on a simulation calculation, so that effects by the reflected sound power of the walls are reduced.

The REMA system 110 measures the position of the sound source 20 according to a beam forming method based on the output of the REMA 11 and the posture of the REMA 11. The IRMA system 120 measures the position of the sound source 20 based on the output from the IRMA 12. The MAI 130 measures the position of the sound source 20 by integrating the respective measurement results of the REMA system 110 and the IRMA system 120 utilizing a particle filter, and such a measurement result is then output to the LCD 132.

A first process is executed (FIG. 4/S110) by the REMA system 110. Specifically, based on the output from the REMA 11, a direction of the sound source 20 in the coordinate system of the robot (or a REMA coordinate system) is measured in real time according to MUSIC (Multiple Signal Classification), which is a type of adaptive beam former.

For converting the direction of the sound source 20 in the robot coordinate system to a direction in a fixed coordinate system (refer to the X-Y plane shown in FIG. 3), the inclination of the head portion P1 in the fixed coordinate system is measured as a posture of the REMA 11. The inclination of the head portion P1 in the fixed coordinate system is measured based on the output from rotary encoders, representing the angles and more particularly the posture of each of the joints of the robot 10. A delay time of the output from the encoders is considered in order that the sound signal processing by the REMA 11 will be synchronized highly precisely with the posture measurement of the head portion P1 in the fixed coordinate system. Such a delay time, for example, is measured based on a phase difference of the encoders, which are provided for measuring common angles in the robot 10 such as the rotation angle for rotating the yaw axis of the head portion P1 with respect to the base body P0, etc., and outputs from respective potentiometers.

The posture of the REMA 11 in the fixed coordinate system may also be measured based on the positions of marks obtained through communications with the control system 100 of the robot, which are affixed to the walls and floor surface of the room and are taken by the head camera C1 and/or the waist camera C2. Further, the posture of the REMA 11 in the fixed coordinate system may also be measured based on images of the robot 10 obtained through a camera positioned in the room, or based on motion analysis of the robot 10 by means of a mocap (motion capture) system. Even if the measurement method is different, by taking into consideration factors such as the delay time of the posture measurement or the like, sound signal processing by the REMA 11 can be synchronized highly reliably with the posture measurements of the head portion P1 in the fixed coordinate system.

Based on such measurement results, an observational vector $U_{REMA}(t)$ at time t is obtained by the REMA system 110, as represented by equation (1), $$U_{REMA}(t) = \{u_{a1}(t), \ldots, u_{an}(t), \ldots, u_{aN1}(t)\} \quad (1)$$

where N1t is an observation number of the REMA 11 at time t. $u_{an}(t)$ is a vector represented by equation (2), defined by the components of a horizontal angle (direction) $a_{\theta 1}(t)$ in the fixed coordinate system representing a direction of the sound source 20 as seen from an nth REMA microphone, and an estimated power $a_{p1}(t)$ of the sound generated from the sound source 20.

$$u_{an}(t) \equiv (a_{\theta n}(t), a_{pn}(t)) \quad (2)$$

In accordance with MUSIC, by forming dead angles or blind spots in the directions of noise sources, the target sound source direction can be estimated, and further, since the directions of such dead angles can be suitably adjusted corresponding to changes in the environment, robustness can be enhanced (see Document No. 6). Moreover, as an actual implementation of MUSIC, an implementation developed for a humanoid robot object has been utilized (see Document No. 7).

Document No. 6: F. Asano et al., "Real-time Sound Source Localization and Separation System and its Application to Automatic Speech Recognition," In ISCA, editor, Proc. of European Conference on Speech Processing (Eurospeech 2001), pp. 1013-1016, 2001.

Document No. 7: I. Hara et al., "Robust Speech Interface Based on Audio and Video Information Fusion for Humanoid HRP-2," In Proc. of IEEE/RAS International Conference on Intelligent Robots and Systems (IROS-2004), pp. 2404-2410, IEEE, 2004.

Figure 4:
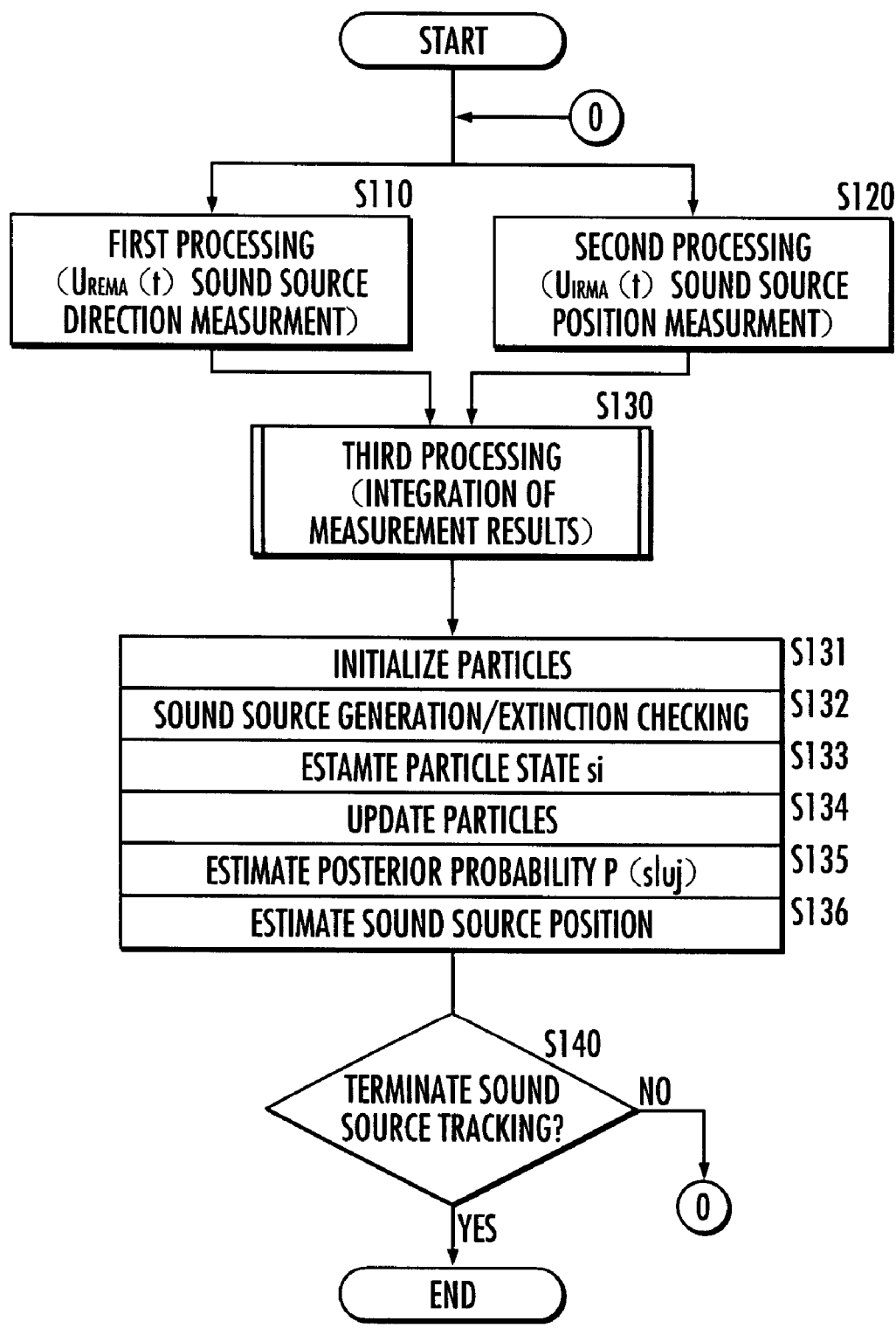
FIG. 4 is a diagram describing functions of the sound source tracking system.

The second processing is carried out by the IRMA system 120 (FIG. 4/S120). More specifically, based on the output from the IRMA 12, the position of the sound source is measured in accordance with a weighted delay-and-sum (WDS-BF) method (see Document No. 8).

Document No. 8: K. Nakadai et al., "Sound Source Tracking with Directivity Pattern Estimation Using a 64-ch Microphone Array," In Proc. of the IEEE/RSJ International Conference on Intelligent Robots and Systems (IROS-2005), pp. 196-202, 2005.

Generally, with typical beam forming, the system output $Y_p(w)$ is expressed by equation (3), based on a vector $X(\omega)$ of the sound source 20 at a position p, a transfer function $H_{p,n}(\omega)$ from the sound source 20 to an nth IRMA microphone 122, a vector $X_n(\omega)$ of a collected signal from the nth IRMA microphone 122, and a filter function $G_{n,p}(\omega)$ applied to the nth microphone 122.

$$Y_p(w) = \Sigma_n G_{n,p}(\omega) X_n(\omega) \quad (3)$$

$$= \Sigma_n G_{n,p}(\omega) H_{p,n}(\omega) X(\omega)$$

According to WDS-BF, various types of transfer functions $H_{p,n}(\omega)$, etc., which are derived from the measurement results, or derived computationally, are generalized so as to be handled uniformly. Further, the norm of the filter function $G_{n,p}(\omega)$ is minimized so as to impart robustness with respect to dynamic changes in the transfer function $H_{p,n}(\omega)$ or distortions in the input signal $X_n(\omega)$ (see Document No. 9).

Document No. 9: Hirofumi Nakajima, "Minimum Mean Energy Sidelobe Beamforming by Using Indefinite Term," J. Acoustical Society of Japan, Vol. 62, No. 10, pp. 726-737, 2006.

Further, the value of the transfer function $H_{p,n}(\omega)$ is set corresponding to a distance $r_n$ from the nth microphone 122 to the sound source 20. Specifically, as shown in equation (4), the transfer function $H_{p,n}(\omega)$ is maintained as is (i.e., the output from the nth microphone 122 is adopted) in the event that the distance $r_n$ is at or below a given threshold $r_{th}$, whereas in the case that the distance $r_n$ exceeds the threshold $r_{th}$, the transfer function $H_{p,n}(\omega)$ is set at zero.

$$H_{p,n}(\omega) = H_{p,n}(\omega) \text{ (if } r_n \leq r_{th}\text{), or} \qquad (4)$$
$$= 0 \text{ (if } r_n > r_{th}\text{)}$$

In accordance therewith, as expressed by equation (5), an observational vector $U_{IRMA}$ at time t is obtained from the IRMA system 120, $$U_{REMA}(t) = \{u_{b1}(t), \ldots, u_{bm}(t), \ldots, u_{bN2t}(t)\} \qquad (5)$$

where N2t is an observation number of the IRMA 12 at time t. $u_{bm}(t)$ is a vector represented by equation (6), defined by the position $(b_{xm}(t), b_{ym}(t))$ of the sound source 20 in the fixed coordinate system, an advancing direction $B_{0m}(t)$ of the sound source 20 in the fixed coordinate system, and an estimated power $b_{pm}(t)$ of the sound generated from the sound source 20.

$$u_{bm}(t) \equiv (b_{xm}(t), b_{ym}(t), B_{0m}(t), b_{pm}(t)) \qquad (6)$$

Further, WDS-BF is applied to the directivity characteristic estimation by expressing the position p in polar coordinates (r, θ). Through application of the directivity characteristics estimation, the direction of orientation of the sound source 20 is estimated, and it is judged whether a person actually is speaking, or whether the voice was output from a speaker.

In addition, a third process is executed by the MAI 130. More specifically, by using a particle filter and integrating the measurement result in the first process with the measurement result in the second process, the position of the sound source 20 is measured.

The particle filter (see Document No. 10) is a method, which is utilized for effectively resolving SLAM (Simultaneous Localization and Mapping) or object tracking and the like (see Document No. 11). Basically, conditions are sampled making use of particles, and by renewing the obtained particles using a transition model and an observational model, the interior state is estimated from the observed results. The particle filter differs from a Kalman filter or the like, which handles only linear transitions, and has the merits of possessing an outline for tracking non-linear movements, easily handling non-Gaussian distributions, and being capable of controlling movement speed based on the particle number, etc. Further, by preparing the transition model and the observational model, the particle filter can be utilized irrespective of the type of data.

Document No. 10: M. S. Arulampalam et al., "A Tutorial on Particle Filters for Online Nonlinear/Non-Gaussian Bayesian Tracking," IEEE Transactions on Signal Processing, Vol. 50, No. 2, pp. 174-188, 2002.

Document No. 11: S. Thurn et al., "Probabilistic Robotics," The MIT Press, 2005.

Nevertheless, because respective measurement results from two different microphone arrays, i.e., the REMA 11 and the IRMA 12, are integrated, problems occur in the event that the particle filter is used. Specifically, these two problems originate in the coexistence of the robot coordinate system and the absolute coordinate system, as well as in the coexistence of the polar coordinate system and the Cartesian coordinate system.

The first problem requires a high degree of time synchronizing between the sound processing and movements of the robot 10. This is because, in order for the measurement results from the REMA system 110 and the measurement results from the IRMA system 120 to be integrated, the measurement results from the REMA system 110 must first be converted from the robot coordinate system into the fixed coordinate system.

The second problem concerns differences in the dimensions of the measurement results. More specifically, in contrast to the measurement results of the REMA system 110, which are one dimensional (a direction or a horizontal angle), the measurement results of the IRMA system 120 are in two dimensions.

Consequently, for solving the first problem, hardware is adopted, which can synchronize acquisition of the sound signals and movements with high precision. Further, for solving the second problem, concerning each of the coordinate systems, a likelihood function and a method for integrating the measurement results in accordance with such a likelihood are adopted. These techniques shall now be described in greater detail below.

In the particle filter, a transition model $p(s(t)|s(t-1))$ and an observational model $p(u(t)|s(t))$ are defined as probability expressions. The transition model $p(s(t)|s(t-1))$ is a model for estimating a state $s(t)$ at a given time t from a state $s(t-1)$ at a time t-1. The observational model $p(u(t)|s(t))$ is a model for evaluating the certainty and reliability of an observational vector $u(t)$ taking into consideration the state $s(t)$.

Further, a particle filter is used, which is improved over a general particle filter in the following manner. Specifically, plural particles are permitted to exist together so as to respond to a plurality of sound sources, and a mechanism is implemented, which dynamically changes the number of concerned groups corresponding to the observed conditions (first improvement). Further, in the event the sound source is moving and has a given velocity degree, based on a hypothesis that the advancing direction does not change suddenly, a nonlinear transition model is adopted, which uses as appropriate random walk and motion equations corresponding to the speed of the sound source (second improvement). In addition, a mechanism for integrating the measured position information by level of likelihood is implemented for the purpose of transparently integrating the measured position information, which differs in number of dimensions, obtained respectively from the REMA 11 and the IRMA 12 (third improvement).

Processing in which the improved particle filter is used shall be described below.

First, the particles are initialized (FIG. 4/S131). The internal state $s_i(t)$ of an ith particle is expressed by equation (7) in accordance with the sound source position $(x_i(t), Y_i(t))$, the sound source velocity $v_i(t)$, and the direction of advancement of the sound source $o_i(t)$.

$$s_i(t) \equiv ((x_i(t), Y_i(t), v_i(t), o_i(t))) \quad (7)$$

Upon initialization, all of the particles are distributed uniformly and randomly. Further, for handling multiple sound sources, the total N of the particles is divided into S (>1) particle groups $P_k$ each containing $N_k$ particles therein. Furthermore, for each of the particle groups $P_k$, a degree of importance $w_i$ of the ith particle, in view of the contribution thereof to tracking of the sound source, is introduced to satisfy normalization conditions, as represented by equation (8).

$$\Sigma_{i \in Pk} w_i = 1 \quad (8)$$

Further, for handling the plural sound sources, a sound source generation/extinction check is carried out (FIG. 4/S132).

The internal state $S_k(t)$ of the particle group $P_k$ at time t is defined by equation (9).

$$Sk(t) \equiv \Sigma_{i \in Pk} s_i(t) \cdot w_i(t) \quad (9)$$

Furthermore, as shown in equation (10a), a condition satisfying that the Euclidean distance of a jth observed result $u_{aj}(t)$ by the REMA system 110 with the internal state $S_k(t)$ of the particle group $P_k$ is less than a given threshold valve $D_{th}$ is set as a prerequisite, and the observed result $u_{aj}(t)$ is associated with the particle group $P_k$. Similarly, as shown in equation (10b), a condition satisfying that the Euclidean distance of a jth observed result $u_{bj}(t)$ by the IRMA system 120 with the internal state $S_k(t)$ of the particle group $P_k$ is less than the threshold valve $D_{th}$ is set as a prerequisite, and the observed result $u_{bj}(t)$ is associated with the particle group $P_k$.

$$|S_k(t) - u_{aj}(t)| < D_{th} \quad (10a)$$

$$|S_k(t) - u_{bj}(t)| < D_{th} \quad (10b)$$

On the other hand, in the case there is no particle group $P_k$ corresponding to the observed results, a new particle group is generated. Further, in the case that, over a predetermined time period, an observational result associated with the particle group $P_k$ is not obtained, the concerned particle group is extinguished or nullified. In any of these cases, the degree of importance $w_i$ is set so as to satisfy the normalization conditions, which are indicated by equation (8).

Next, based on the state $s_i(t-1)$ of the ith particle at time t−1, in accordance with the transition model $p(s(t)|s(t-1))$, the state $s_i(t)$ of the ith particle at time t is estimated (FIG. 4/S133).

The transition model, as described previously, is a non-linear model, which uses, as appropriate, random walk and motion equations corresponding to the speed v of the sound source 20. More specifically, in the case that the sound source velocity v is equal to or less than a given threshold $v_{th}$ (e.g., 2 m/s), a random walk model is adopted, in which the transition model (first transition model) is expressed by equation (11), $$s_i(t) = s_i(t-1) + r;$$

$$r = (r_x, r_y, r_z, r_o) \quad (11)$$

where r represents Gaussian noise.

On the other hand, in the event that the sound source velocity v exceeds the threshold $v_{th}$, the transition model (second transition model) is expressed by the following motion equations (12a) to (12d).

$$x_i(t) = x_i(t-1) + v_i(t-1) \cdot \cos(o_i(t-1)) + r_x \quad (12a)$$

$$x_i(t) = x_i(t-1) + v_i(t-1) \cdot \sin(o_i(t-1)) + r_y \quad (12b)$$

$$v_i(t) = \alpha \cdot v_i(t-1) + (1-\alpha) \cdot \{(\Delta x_i(t))^2 + (\Delta y_i(t))^2\}^{1/2} + r_v,$$

$$\Delta x_i(t) = x_i(t) - x_i(t-1),$$

$$\Delta y_i(t) = y_i(t) - y_i(t-1) \quad (12c)$$

$$o_i(t) = \alpha \cdot o_i(t-1) + (1-\alpha) \cdot \tan^{-1}\{(\Delta x_i(t)/\Delta y_i(t)\} + r_o \quad (12d)$$

The degree of importance $w_i(t)$ of the ith particle is updated according to equation (13), based on an integrated likelihood $L_I(t)$, under the normalization conditions indicated by equation (8).

$$w_i(t) = L_I(t) \cdot w_i(t-1) \quad (13)$$

The integrated likelihood $L_I(t)$ is expressed by equation (14), based on a REMA likelihood $L_{REMA}$, an IRMA likelihood $L_{IRMA}$, and an appropriately set integration weighting $\alpha_L$.

$$L_I(t) = \alpha_L \cdot L_{REMA}(t) + (1-\alpha_L) \cdot L_{IRMA}(t) \quad (14)$$

The REMA likelihood $L_{REMA}$ is defined by equation (15), based on the angle $\theta_x(s_i(t))$ formed on the x-axis from the state (vector) $s_i(t)$ of the ith particle filter, the robot position $P_{REMA}(t)$, and the distribution $R_{REMA}$ of the sound source position measurement result by the REMA 11.

$$L_{REMA}(t) \equiv \exp[-\{\theta_x(s_i(t)) - P_{REMA}(t) - \theta_L\}^2 / 2R_{REMA}] \quad (15)$$

The IRMA likelihood $L_{IRMA}$ is defined by equation (16), based on the state $s_i(t)$ of the ith particle, an observation vector $u_{bm}(t)$ obtained from the IRMA 12, the Euclidean distance $|s_i(t) - u_{bm}(t)|$, and the distribution $R_{IRMA}$ of the sound source position measurement result by the IRMA 12.

$$L_{IRMA}(t) \equiv \exp[-|s_i(t) - u_{bm}(t)|^2 / 2R_{IRMA}] \quad (16)$$

In addition, the particles are updated based on the degree of importance $w_i$ (FIG. 4/S134).

Specifically, the number of the ith particle belonging to the particle group $P_k$ is updated according to equation (17).

$$N_{ki} = \text{round}(N_k \cdot w_i) \quad (17)$$

Further, the remaining non-updated particles $R_k$ $(= N_k - \Sigma_{i \in Pk} N_{ki})$ are distributed in accordance with a residual weighting parameter $R_{wi}$ expressed by equation (18). At this time, a general SIR (Sampling Importance Resampling) algorithm is used (refer to Document No. 2).

$$R_{wi} = w_i - N_{ki} / \Sigma_{j \in Pk} N_j \quad (18)$$

Furthermore, a posterior probability $p(s(t)|u_j(t))$ is estimated from the post-updated particle density (FIG. 4/S135). The internal state $S_k(t)$ of the kth particle group $P_k$ with respect to the sound source 20 is estimated according to equation (9).

Additionally, based on the estimated posterior probability $p(s(t)|u_j(t))$, the position of the sound source 20 in the fixed coordinate system is estimated (FIG. 4/S136). The position estimation result or the tracking result for the sound source 20 is sent to a sound viewer, which is implemented by Java 3D (registered trademark), and the tracking results are displayed successively in three dimensions.

It is judged whether or not sound source tracking is completed (FIG. 4/S140). In the case that the judgment result is negative (FIG. 4/S140 . . . NO), the aforementioned processing is repeated. On the other hand, in the event that the judgment result is positive (FIG. 4/S140 . . . YES), the process sequence is terminated.

In accordance with the sound source tracking system 1 which exhibits the foregoing functions, the sound source direction measurement result based on the output from the REMA (first microphone array) and the sound source position measurement result based on the output from the IRMA (second microphone array), are integrated or spatially integrated utilizing a particle array (refer to FIG. 4/S130). Owing thereto, mutual defects and ambiguities of the different microphone arrays, more specifically, the REMA 11 and the IRMA 12, can be cancelled out. Accordingly, performance of sound source orientation can be improved taking into consideration improvements in accuracy and robustness.

Further, a sub-array method is adopted using only a subset of the IRMA 12, which is selected based on the distance $r_n$ between the respective plural microphones 122 that make up the IRMA (second microphone array) and the sound source 20 (refer to FIG. 4/S120). More specifically, a subset of the IRMA 12 is selected (see equation (4)) by setting the transfer function $H_{p,n}(\omega)$ of the IRMA microphones 122 for which the distance rn of the sound source exceeds the threshold $r_{th}$. Owing thereto, the computational burden on the IRMA system (second processor) 120 is reduced, and the calculation time required thereby is shortened.

Figure 5:
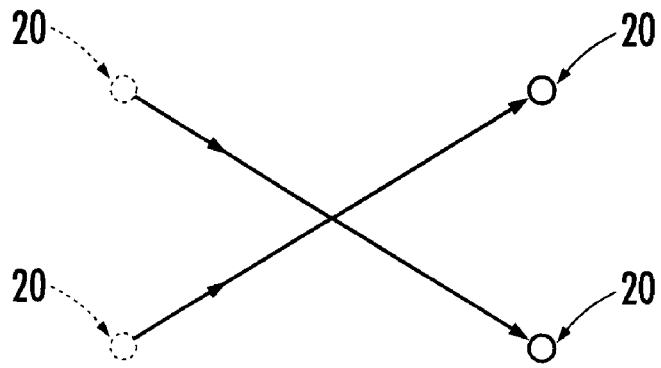
FIG. 5a is a first descriptive diagram concerning sound source tracking ambiguity.
FIG. 5b is a second descriptive diagram concerning sound source tracking ambiguity.
FIG. 5c is a third descriptive diagram concerning sound source tracking ambiguity.
Figure 5:
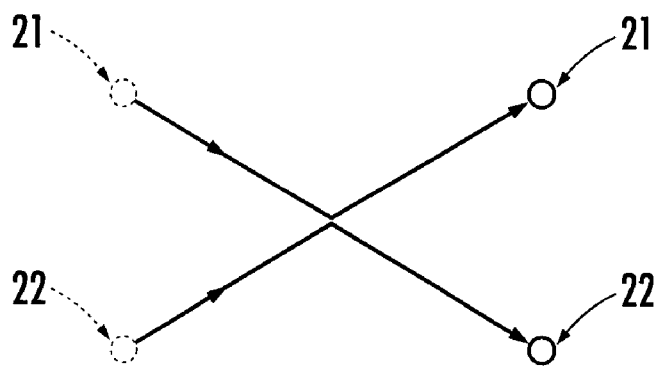
Figure 5:
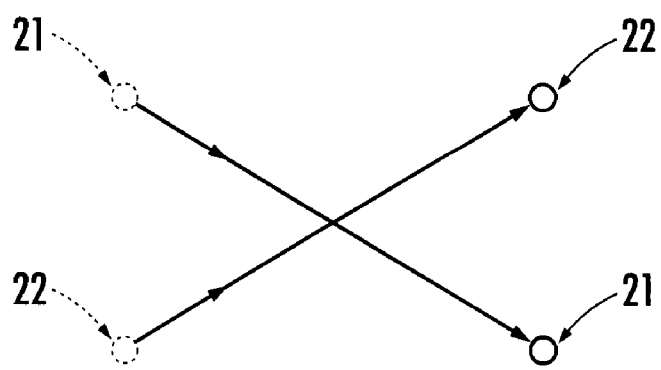

Furthermore, a transition model is used differently depending on the situation, corresponding to the sound source speed v, and more particularly corresponding to the behavioral aspects of the sound source, which are inferred taking into consideration the speed v of the sound source (see FIG. 4/S133). For example, as shown in FIG. 5(a), a behavioral condition may be considered in which two sound sources 20 move so as to gradually approach each other, as shown by the arrows, and thereafter gradually move away from each other. In this case, the possibility of ambiguity exists as to whether, as shown in FIG. 5(b), the first sound source 21 and the second sound source 22 move gradually in a mutually approaching manner, and after approaching, the advancement direction of both changes mutually, or as shown in FIG. 5(c), the first sound source 21 and the second sound source 22 move gradually in a mutually approaching manner, and then even after mutually approaching, the sound sources continue to move without changing their advancement directions. Consequently, the respective behavioral aspects of the first sound source 21 and the second sound source 22 are inferred taking into consideration the respective velocities v thereof, and the transition model is suited thereto.

More specifically, in the case that the sound source velocity is equal to or less than the threshold $v_{th}$, a random walking movement is inferred as the behavioral aspect of the sound source 20, and a first transition model is adopted (refer to equation (11)). Concerning the first transition model, in the case that the first sound source 21 and the second sound source 22 approach each other mutually, and thereafter the advancement direction of both changes, the first transition model is defined as a transition model adopted based on the assumption that the velocity v decreases and becomes equal to or less than the threshold $v_{th}$. Owing thereto, in the event that the velocities v of each of the sound sources 21, 22 are at or below the threshold $v_{th}$ when the first sound source 21 and the second sound source 22 approach each other, orientation tracking is conducted on the hypothesis that the sound sources 21, 22 have behaved as shown in FIG. 5(b).

On the other hand, in the case that the sound source velocity exceeds the threshold $v_{th}$, a second transition model is adopted (refer to equations (12a) to (12d)). Concerning the second transition model, in the case that the advancement direction is maintained before and after the first sound source 21 and the second sound source 22 approach each other, the second transition model is defined as a transition model adopted based on the assumption that the velocity v does not decrease that much and exceeds the threshold $v_{th}$. Owing thereto, in the event that the velocities v of each of the sound sources 21, 22 exceed the threshold $v_{th}$ when the first sound source 21 and the second sound source 22 approach each other, orientation tracking is conducted on the hypothesis that the sound sources 21, 22 have behaved as shown in FIG. 5(c).

Accordingly, a condition in which it becomes ambiguous or unclear whether the object to be tracked is the first sound source 21 or the second sound source 22 is avoided, and precision in orientation tracking of each of the sound sources 21, 22 can be improved.

Further, the different orientation results from the different microphone arrays, that is, the direction measurement result of the sound source 20 by the REMA system 110 and the position measurement result by the IRMA system 120 are integrated in accordance with a weighted sum of the likelihoods, $L_{REMA}$ and $L_{IRMA}$, of each of the measurement results (see FIG. 4/S134 and equation (14)). Accordingly, compared to a case in which the aforementioned measurement results, specifically, the observational vector $U_{REMA}(t)$ obtained by the REMA system 110 and the observational vector $U_{IRMA}(t)$ obtained by the IRMA system 120, are directly integrated, integration of the aforementioned measurement results can be carried out more easily.

Next, an explanation shall be made concerning performance evaluation results of position measurement and tracking of the sound source, according to a method utilizing the REMA 11 in conjunction with the IRMA 12.

Figure 6:
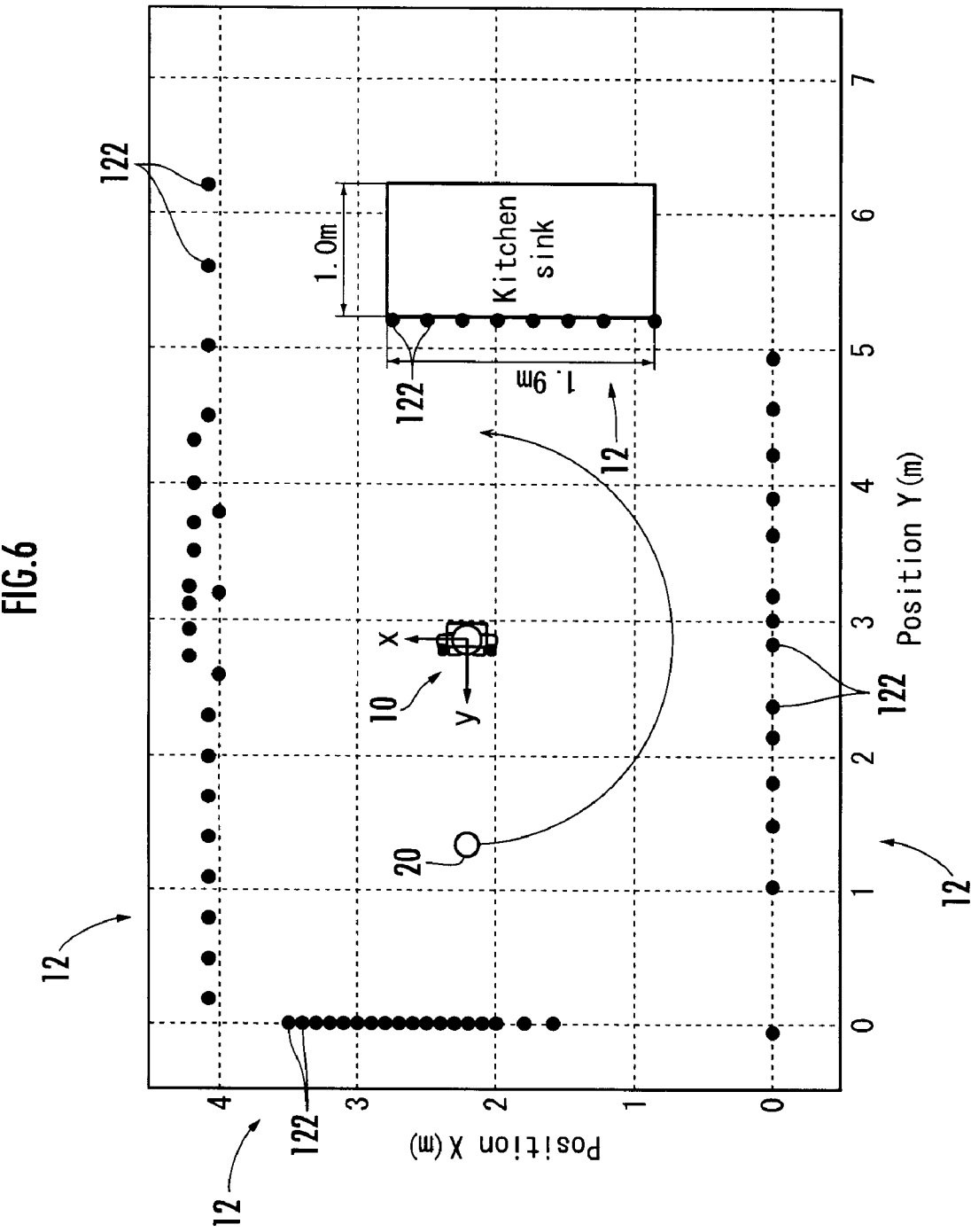
FIG. 6 is a first descriptive diagram of sound source tracking experimental conditions.

As shown in FIG. 6, a condition is set up in which a person (sound source 20) moves counterclockwise around the robot 10, tracing a semicircle as shown by the arrow, while ordinarily speaking in a direction toward the robot 10, and in a state in which the robot coordinate system (x, y) is inclined 180° with respect to the fixed coordinate system (X,Y). In this condition, standard tracking results of the sound source 20, in which an ultrasonic 3D tag system (U3D-TS) (see Document No. 12) is used, are shown by the broken lines respectively in FIGS. 7(a) and 7(b).

Document No. 12: Y. Nishida et al., "3D Ultrasonic Tagging System for Observing Human Activity," In IEEE, editor, Proceedings of the 2003 IEEE/RSJ Int. Conference on Intelligent Robots and Systems (IROS-2003), pp. 785-791, 2003.

Figure 7:
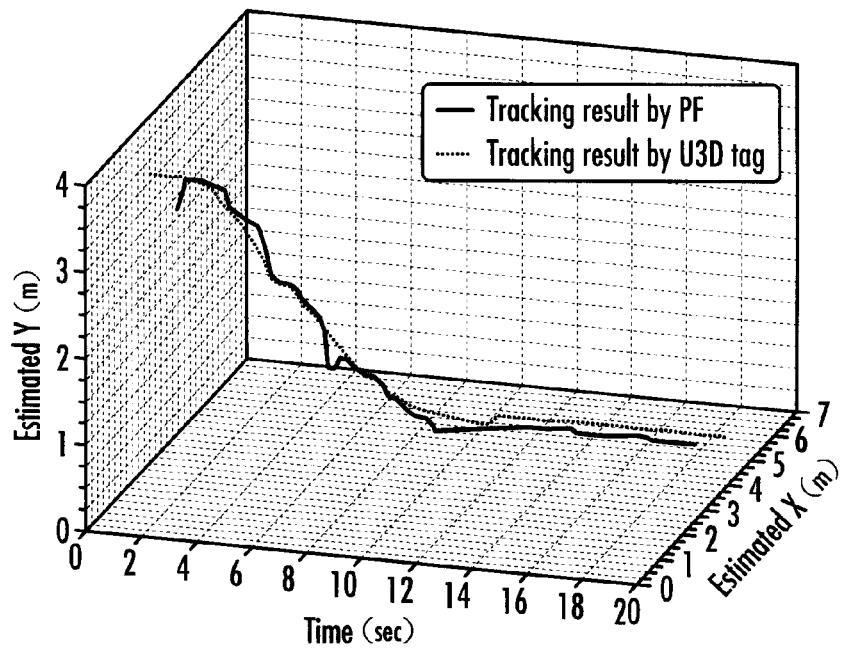
FIG. 7a is a first descriptive diagram of comparative tracking results of a sound source.
FIG. 7b is a first descriptive diagram of comparative tracking results of the sound source according to a method of the present invention.
Figure 7:
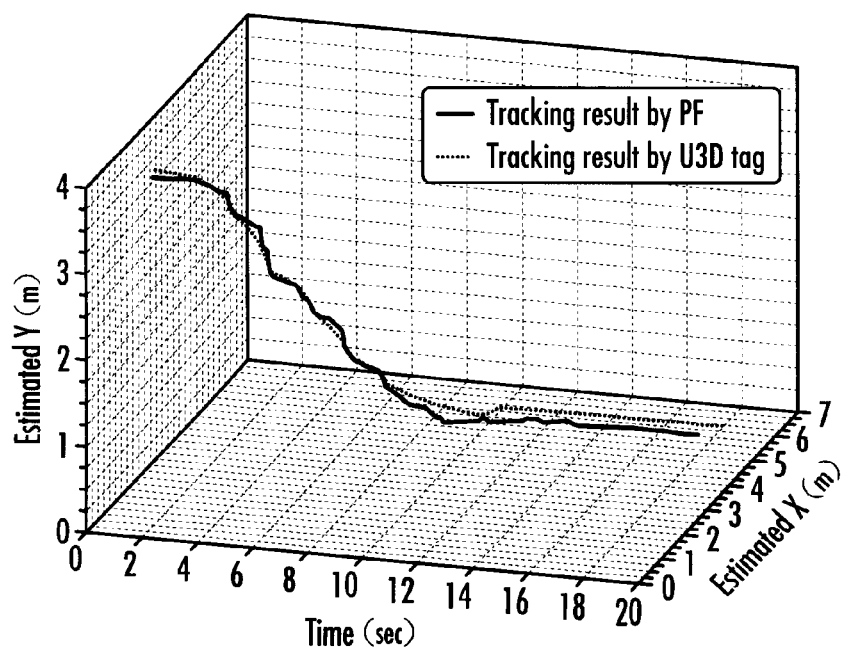

Further, under the same conditions, a comparative tracking result of the sound source 20, at a time when the particle filter is applied using only measurement results obtained from the IRMA system 120, is shown by the solid line in FIG. 7(a). Moreover, under the same conditions, a tracking result of the sound source 20, at a time when the particle filter is applied using both the REMA system 110 and the IRMA system 120 according to the method of the present invention, is shown by the solid line in FIG. 7(b).

The average error and the standard deviation of the comparative tracking result (solid line) with respect to the standard reference tracking result (broken line) shown in FIG. 7(a) are 0.12 m and 0.062 m, respectively. With respect thereto, the average error and the standard deviation of the tracking result (solid line) according to the method of the present invention with respect to the standard reference tracking result (broken line) shown in FIG. 7(b) are 0.10 m and 0.040 m, respectively. More specifically, the tracking result (solid line of FIG. 7(b)) according to the method of the present invention is more consistent with the standard reference tracking result (broken lines in FIGS. 7(a) and 7(b)) than the comparative tracking result (solid line in FIG. 7(a)), and thus it was confirmed experimentally that tracking and measurement accuracy was high. Further, similarly under a condition in which the REMA 11 coordinate system or the robot coordinate system was rotated with respect to the fixed coordinate system so that the head portion P1 remained oriented toward the person 20, the height of the measurement accuracy according to the method of the present invention was confirmed. Concerning the REMA 11 coordinate system, the orientation of the robot 10 was changed extemporaneously, and in addition to or in place thereof, by rotating the head portion P1 around the yaw axis with respect to the base body P0, the REMA 11 coordinate system was rotated with respect to the fixed coordinate system.

Figure 8:
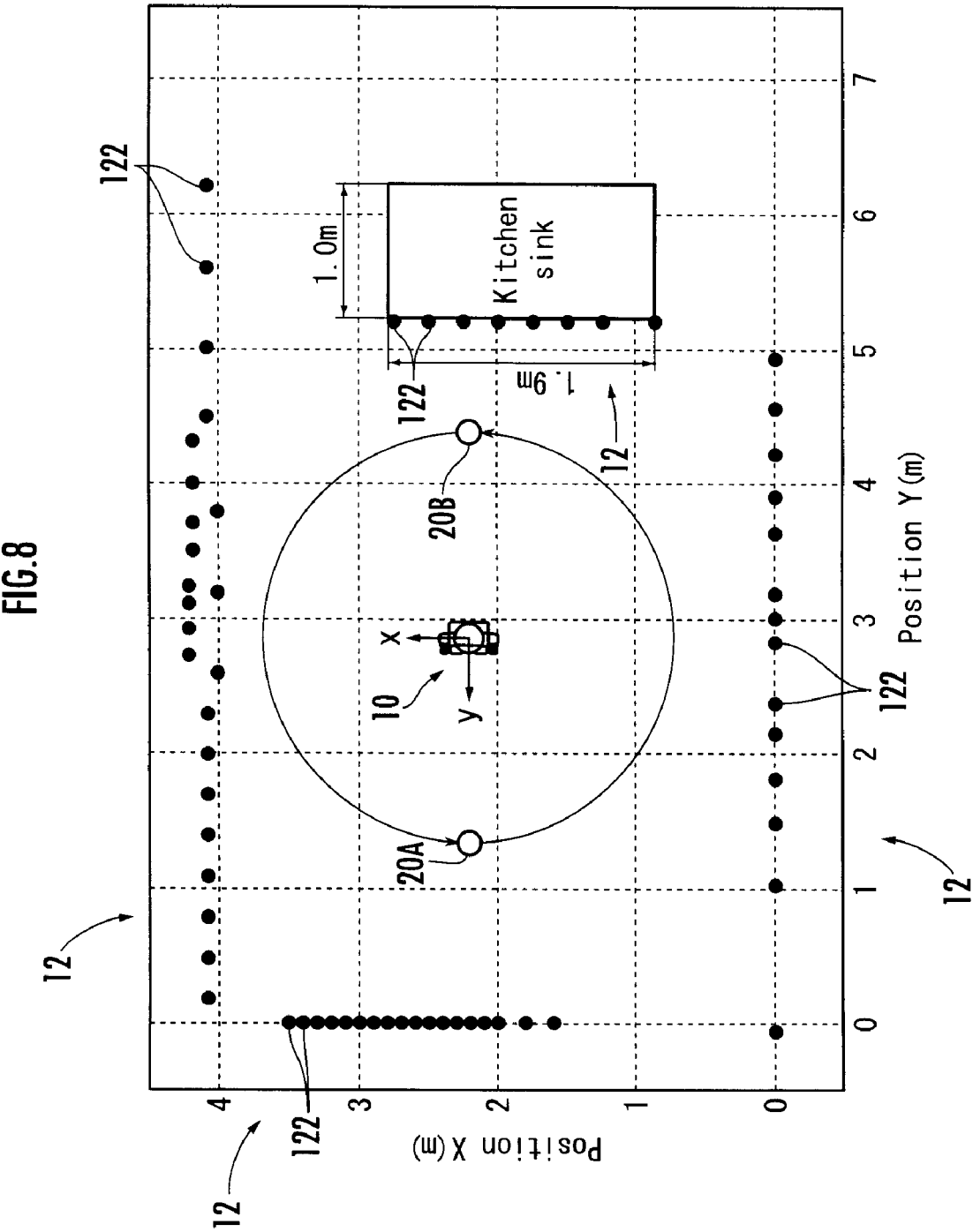
FIG. 8 is a second descriptive diagram of sound source tracking experimental conditions.

Further, as shown in FIG. 8, under a condition in which the robot coordinate system (x, y) is tilted 180° with respect to the fixed coordinate system (X, Y), at an initial state, while a first person (sound source) 20A and a second person (sound source) 20B, which face each other sandwiching the robot 10 therebetween, each speaks normally toward the robot 10, respectively, a situation is set up wherein the first and second persons move counterclockwise centrally about the robot 10, so as to trace semicircles as shown by the arrows. In this condition, respective standard reference tracking results of the sound sources 20A and 20B, using the ultrasonic 3D tagging system (U3D-TS) (see Document No. 12), are shown by the broken lines in FIGS. 9(a) and 9(b) respectively.

Figure 9:
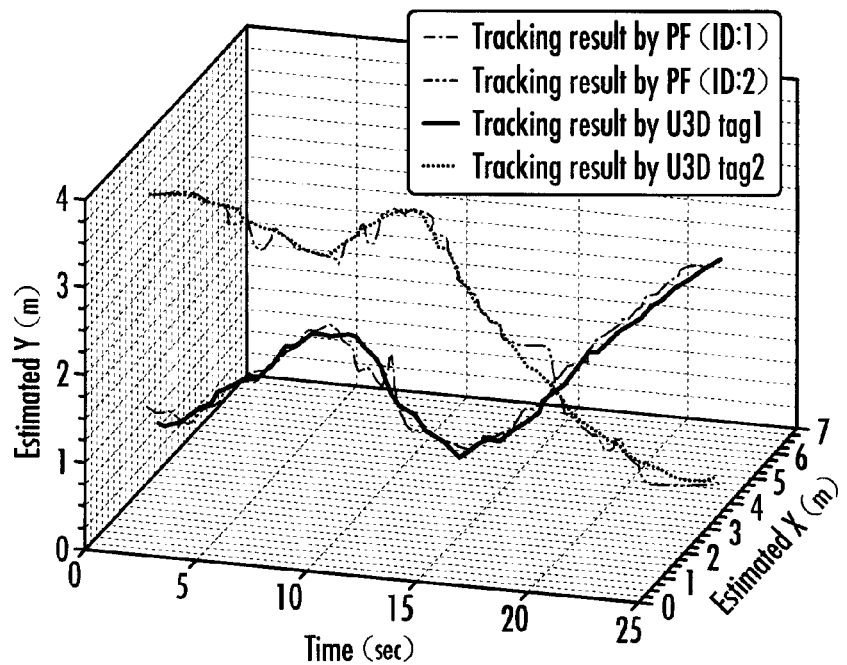
FIG. 9a is a second descriptive diagram of comparative tracking results of a sound source.
FIG. 9b is a second descriptive diagram of comparative tracking results of the sound source according to a method of the present invention.
Figure 9:
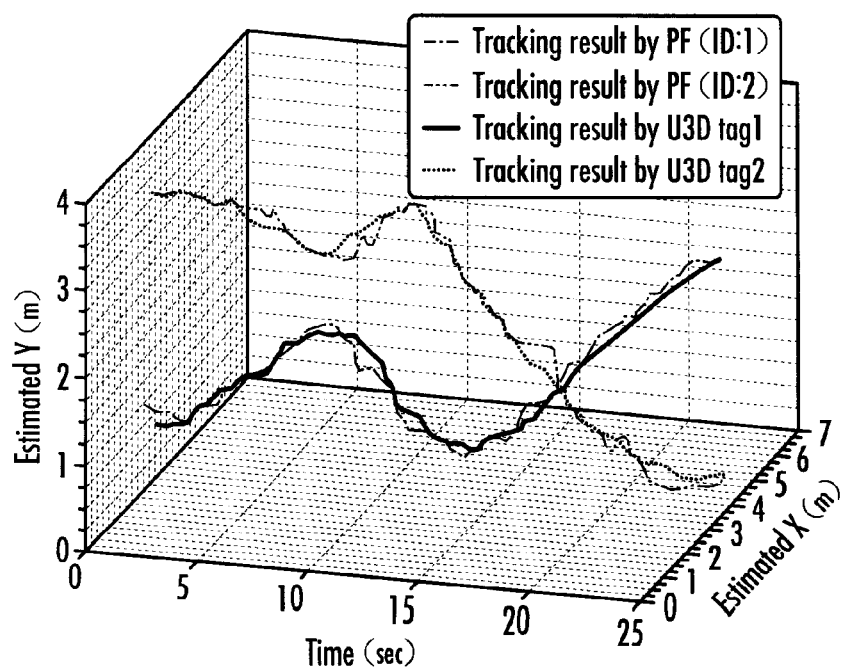

Further, under the same conditions, a comparative tracking result of each of the respective sound sources 20A and 20B, at a time when the particle filter is applied using only measurement results obtained from the IRMA system 120, are shown respectively by the one-dot chain line and the two-dot chain line in FIG. 9(a). Moreover, under the same conditions, a tracking result of each of the respective sound sources 20A and 20B, at a time when the particle filter is applied using both the REMA system 110 and the IRMA system 120 according to the method of the present invention, are shown respectively by the one-dot chain line and the two-dot chain line in FIG. 9(b).

The average error and the standard deviation of the comparative tracking results (one-dot chain line and two-dot chain line) with respect to the standard reference tracking result (broken line) shown in FIG. 9(a) are 0.16 m and 0.084 m, respectively. With respect thereto, the average error and the standard deviation of the tracking result (solid line) according to the method of the present invention with respect to the standard reference tracking result (broken line) shown in FIG. 9(b) are 0.16 m and 0.083 m, respectively. More specifically, the tracking result (solid line of FIG. 7(b)) according to the method of the present invention is more consistent with the standard reference tracking result (broken lines in FIGS. 9(a) and 9(b)) than the comparative tracking result (solid line in FIG. 9(a)), and thus it was confirmed experimentally that tracking and measurement accuracy (albeit slightly better) was high. Further, similarly under a condition in which the REMA 11 coordinate system or the robot coordinate system was rotated with respect to the fixed coordinate system so that the head portion P1 remained oriented toward the first person 20A, the height of the measurement accuracy according to the method of the present invention was confirmed. Apart therefrom, even under various other conditions, improvements in sound source tracking accuracy were confirmed together with improvements in system robustness.

Figure 10:
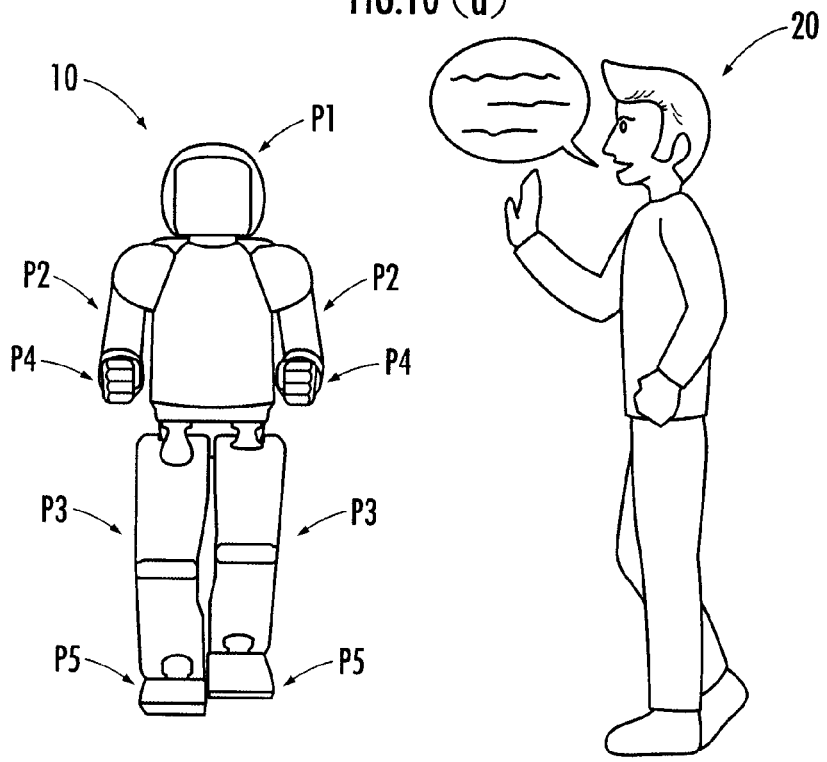
FIG. 10a is an explanatory diagram of controlling robot behavior based on sound source tracking results.
FIG. 10b is another explanatory diagram of controlling robot behavior based on sound source tracking results.
Figure 10:
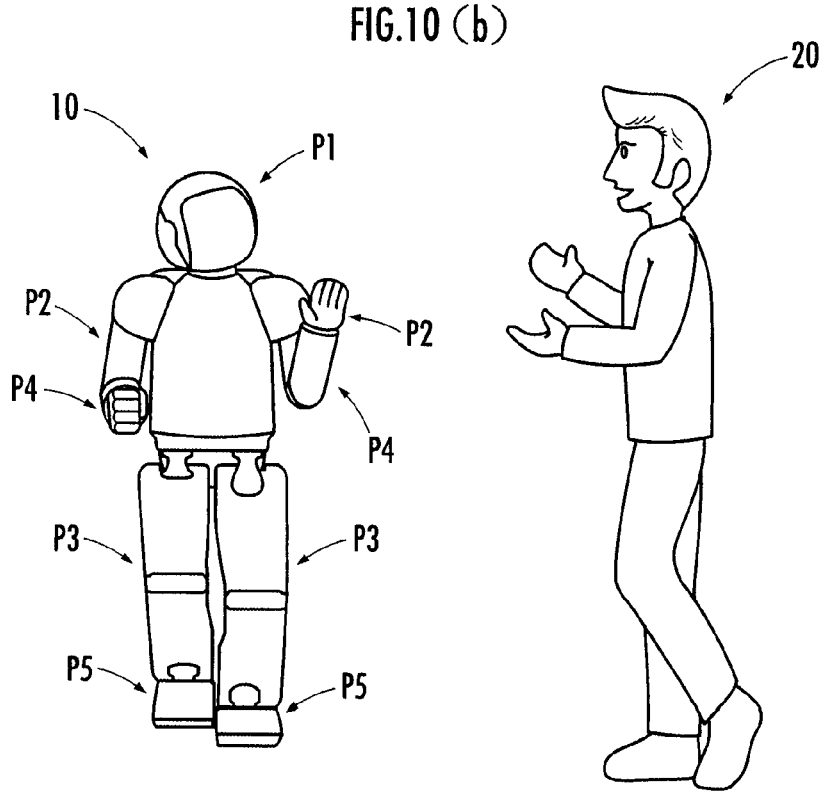

The sound source tracking results may be transmitted from the sound source tracking system 1 to the control system 100 of the robot 10, whereby based on the tracking results, the control system 100 controls movements of the robot 10. For example, as shown in FIG. 10(a), a condition may be contemplated in which a person (sound source) 20 is speaking at a position next to the robot 10. As indicated above, the REMA 11 is mounted in the robot 10, while the IRMA 12 is disposed around the vicinity. Each of the robot 10 and the person 20, respectively, may be either moving or stationary. Under this condition, based on the sound source tracking results, for example as shown in FIG. 10(b), the behavior of the robot 10 may be controlled so that the head portion P1 is turned to face toward the person 20, and further, one hand P3 may be raised and offered to the person 20. In this manner, based on the tracking result of the sound source (person) 20 having robustness and high accuracy, the behavior of the robot 10 can be controlled appropriately, from the viewpoint of making surrounding persons feel a sense of familiarity toward the robot (humanoid robot) 10. Further, even in the case that multiple sound sources (persons) 20 are present, ambiguity in behavior of the robot 10 is canceled out, and robustness can be enhanced.

Further, location tracking of the sound source 20 may also be performed using multiple REMAs 11, which are mounted respectively on a plurality of robots 10, tracking of the sound source 20 may be performed using multiple IRMAs 12 each having different dispositions or differing microphone characteristics, etc., or tracking of the sound source 20 may be performed using a combination of plural REMAs 11 and plural IRMAs 12.

The invention claimed is:

1. A sound source tracking system for measuring in real time the position of a sound source, comprising:
   a first processor configured to measure a position or direction of said sound source according to a beam forming method based on an output from a first microphone array, the first microphone array built into a moving body having a movement function, and a posture of said first microphone array;
   a second processor configured to measure the position of said sound source based on an output from a second microphone array, the second microphone array fixedly arranged and separated from the moving body; and
   a third processor configured to measure the position of said sound source by integrating respective measurement results from said first and second processors utilizing a particle filter.

2. The sound source tracking system according to claim 1, wherein said second processor is further configured to estimate a distance between respective plural microphones making up said second microphone array and said sound source, and to measure the position of said sound source based solely on outputs from microphones from among said plural microphones for which the estimated distance is a given threshold amount or lower.

3. The sound source tracking system according to claim 1, wherein said third processor is configured to measure a speed of said sound source, and based on a measurement result thereof, to measure the position of said sound source while switching a transition model of said particle filter.

4. The sound source tracking system according to claim 1, wherein said third processor is configured to calculate a likelihood of the measurement result by each of said first and second processors, and to measure the position of said sound source based on a weighted sum of said likelihoods.

5. A sound source tracking method for measuring in real time the position of a sound source, comprising the steps of:
   performing a first process of measuring a position or direction of said sound source according to a beam forming method based on an output from a first microphone array, the first microphone array built into a moving body having a movement function, and a posture of said first microphone array;
   performing a second process of measuring the position of said sound source based on an output from a second microphone array, the second microphone array fixedly arranged and separated from the moving body; and performing a third process for of measuring the position of said sound source by integrating respective measurement results from said first and second processes utilizing a particle filter.

6. A robot having a movement function and used in a sound source tracking system for measuring in real time the position of a sound source, said sound source tracking system comprising:

a first processor configured to measure a position or direction of the sound source according to a beam forming method based on an output from a first microphone array, the first microphone array built into said robot, and a posture of said first microphone array;

a second processor configured to measure the position of said sound source based on an output from a second microphone array, the second microphone array fixedly arranged and separated from the robot; and a third processor configured to measure the position of said sound source by integrating respective measurement results from said first and second processors utilizing a particle filter, wherein said robot further comprises a control system configured to control movement of said robot based on the position of said sound source as measured by said third processor.

7. The sound source tracking system according to claim 1, wherein said second microphone array is fixedly arranged in at least one room, and said second processor and said third processor are configured to measure the position of said sound source within said at least one room.

8. The sound source tracking system according to claim 7, wherein said second processor and said third processor are configured to measure the position of said sound source as a discrete point within said at least one room.

9. The sound source tracking system according to claim 1, further comprising:

said first microphone array built into said moving body; and said second microphone array fixedly arranged and separated from said moving body.

10. The sound source tracking method according to claim 5, wherein the second process further comprises estimating a distance between respective plural microphones making up the second microphone array and said sound source, and measuring the position of said sound source based solely on outputs from microphones from among said plural microphones for which the estimated distance is a given threshold amount or lower.

11. The sound source tracking method according to claim 5, wherein the third process further comprises measuring a speed of said sound source, and based on a measurement result thereof, measuring the position of said sound source while switching a transition model of said particle filter.

12. The sound source tracking method according to claim 5, wherein the third process further comprises calculating a likelihood of the measurement result by each of said first and second processes, and measuring the position of said sound source based on a weighted sum of said likelihoods.

13. The sound source tracking method according to claim 5, wherein the second process further comprises measuring the position of said sound source within at least one room in which said second microphone array is fixedly arranged, and the third process further comprises measuring the position of said sound source within said at least one room.

14. The sound source tracking method according to claim 13, wherein the second process and third process each further comprise measuring the position of said sound source as a discrete point within said at least one room.

15. The sound source tracking method according to claim 5, wherein the first process further comprises receiving an input from said sound source by said first microphone array and translating said input into said output from said first microphone array; and the second process further comprises receiving an input from said sound source by said second microphone array and translating said input into said output from said second microphone array.

16. The robot according to claim 6, wherein said second processor is configured to measure the position of said sound source within at least one room in which the second microphone array is fixedly arranged, and said third processor is configured to measure the position of said sound source within said at least one room.

17. The robot according to claim 16, wherein said second processor and said third processor are configured to measure the position of said sound source as a discrete point within said at least one room.

18. The robot according to claim 6, wherein said second processor is further configured to estimate a distance between respective plural microphones making up said second microphone array and said sound source, and to measure the position of said sound source based solely on outputs from microphones from among said plural microphones for which the estimated distance is a given threshold amount or lower.

19. The robot according to claim 6, wherein said third processor is configured to measure a speed of said sound source, and based on a measurement result thereof, to measure the position of said sound source while switching a transition model of said particle filter.

20. The robot according to claim 6, wherein said third processor is configured to calculate a likelihood of the measurement result by each of said first and second processors, and to measure the position of said sound source based on a weighted sum of said likelihoods.

\* \* \* \* \*